United States Patent
Price et al.

(10) Patent No.: US 6,958,725 B1
(45) Date of Patent: Oct. 25, 2005

(54) RADOME ABERRATION CORRECTING SYSTEM

(75) Inventors: John Clifford Price, Southgate (GB); Trevor Stanley Moore, Pinner (GB)

(73) Assignee: BAE Systems Electronics Limited, Hampshire (GB)

(*) Notice: Subject to any disclaimer, the term of this patent is extended or adjusted under 35 U.S.C. 154(b) by 1826 days.

(21) Appl. No.: 06/308,184

(22) Filed: Sep. 28, 1981

Related U.S. Application Data

(63) Continuation-in-part of application No. 06/054,148, filed on Jun. 29, 1979, now abandoned.

(51) Int. Cl.$^7$ .............................. G01S 7/40; G01S 7/00; H01Q 1/42
(52) U.S. Cl. ................. 342/173; 342/165; 342/174; 342/175; 342/195; 343/872
(58) Field of Search ................. 343/872, 873; 342/73–81, 159, 165–175, 195, 61–65; 244/3.1–3.3

(56) References Cited

U.S. PATENT DOCUMENTS

| | | | | |
|---|---|---|---|---|
| 3,316,549 A | * | 4/1967 | Hallendorf | 342/77 |
| 3,940,767 A | * | 2/1976 | DeLano et al. | 342/63 |
| 4,303,211 A | * | 12/1981 | Dooley et al. | 244/3.19 |

* cited by examiner

*Primary Examiner*—Bernarr E. Gregory
(74) *Attorney, Agent, or Firm*—Kirschstein, et al.

(57) ABSTRACT

A system for correcting the effect of radome aberration on line-of-sight signals indicating target position. The aberration is in fact dependent upon both operating frequency and 'angle-of-look' and the essence of the present invention is to separate the corrections appropriate to each of these factors. The apparent line-of-sight signals are subjected to a frequency dependent amplification the result being used to address a store of error correction data. The apparent line of sight signals are also used to address a second store of error correction data and the two sets of correction data are added into the apparent line-of-sight signals to give true line-of-sight.

4 Claims, 3 Drawing Sheets

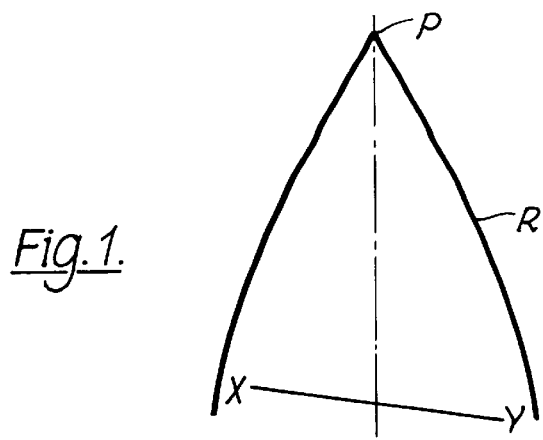
Fig.1.
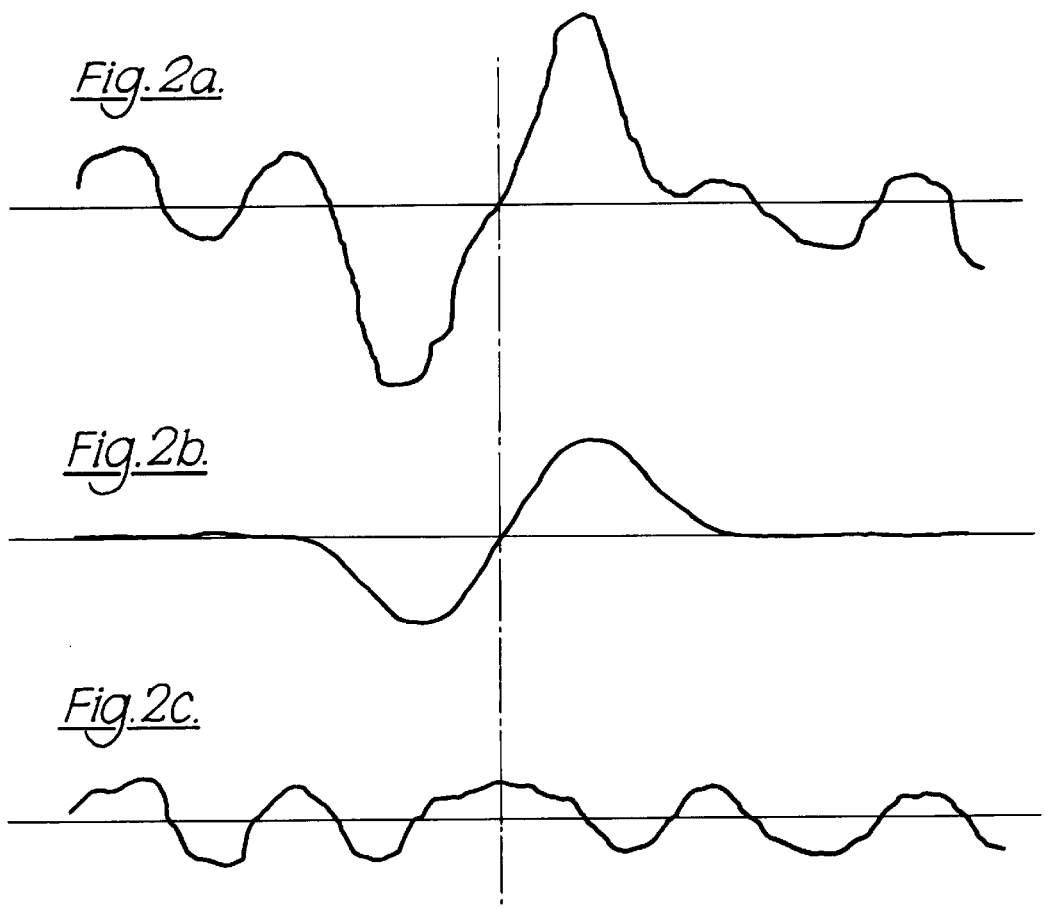
Fig.2a.
Fig.2b.
Fig.2c.

RADOME ABERRATION CORRECTING SYSTEM

CROSS REFERENCE TO RELATED APPLICATION

This application is a continuation-in-part of application Ser. No. 06/054,148 filed Jun. 29, 1979 now abandoned.

BACKGROUND OF THE INVENTION

This invention relates to a radome aberration correcting system, particularly, although not exclusively, for use in a target tracking missile.

It is known that the effect of a radome between a steerable antenna and a target gives rise to errors in the derivation of the target line of sight. It has previously been proposed to correct such aberration by adjusting the thickness of the radome locally for a range of target directions relative to the radome. Such a procedure is very tedious and time consuming since the radome is commonly made of refractory ceramic material which has to be ground to adjust its contour.

Another proposal for correcting radome aberration is-to-store the line of sight errors for a range of target directions and to make the appropriate correction according to the apparent line of sight.

Both of these proposals however are practicable only in a single frequency, or at least very narrow band, system. In the case of the mechanical adjustment by local grinding, it can even happen that the adjustments made for one particular operating frequency actually make matters worse at a slightly different frequency.

It might be thought that in the case of the error storage correction method, it would be simply a matter of storing a greater range of errors, i.e. repeat the stored data appropriate to one particular frequency for each of a range of frequency values. In practice it is found that this is not a practicable solution however because of the vast amount of storage necessary.

SUMMARY OF THE INVENTION

An object of the present invention is therefore to provide a correcting system which is operable over a reasonably broad band and which at the same time does not require very great storage facilities.

According to the present invention therefore, a radome aberration correcting system comprises a directional antenna system and an associated radome having a profile discontinuity, means for deriving information from the antenna system as to the apparent line of sight of a target, first storage means for storing predetermined data in respect of line of sight errors arising from said discontinuity which errors are functions of the operating frequency and of the line of sight, second storage means storing predetermined data in respect of line of sight errors other than errors arising from said discontinuity, and means for correcting the apparent line of sight information in dependence upon the data, corresponding to said apparent line of sight, stored in said first and second storage means.

The first storage means may thus be arranged to store a single range of correction data, an addressing signal being derived as a product of apparent line of sight information and a signal which is a function of the operating frequency.

The system may comprise a gain-controlled amplifier to the input of which is applied a signal representing said line of sight information, and a function generator producing a signal whose magnitude oscillates with frequency, the function generator signal being applied as a gain control signal for the amplifier, the output of which provides the addressing signal.

The first storage means is preferably a digital store, analogue/digital converter means being provided to convert the addressing signal to a digital signal.

The first and second storage means are preferably digital storage means, analogue digital converters providing digital addressing signals and analogue output correcting signals.

Parallel systems each as aforesaid provide separate corrections of azimuth and elevation information.

BRIEF DESCRIPTION OF THE DRAWINGS

One embodiment of a radome aberration correcting system in accordance with the invention will now be described, by way of example, with reference to the accompanying drawings, of which:

FIG. 1 shows diagrammatically the profile of a radome and an enclosed antenna;

FIG. 2(*a*) shows a composite diagram of variation of line of sight error with apparent line of sight;

FIG. 2(*b*) shows a component of the diagram of FIG. 2(*a*) in respect of basic refraction;

FIG. 2(*c*) shows another component arising from the discontinuity in the radome profile;

DETAILED DESCRIPTION OF THE PREFERRED EMBODIMENTS

Figure 3:
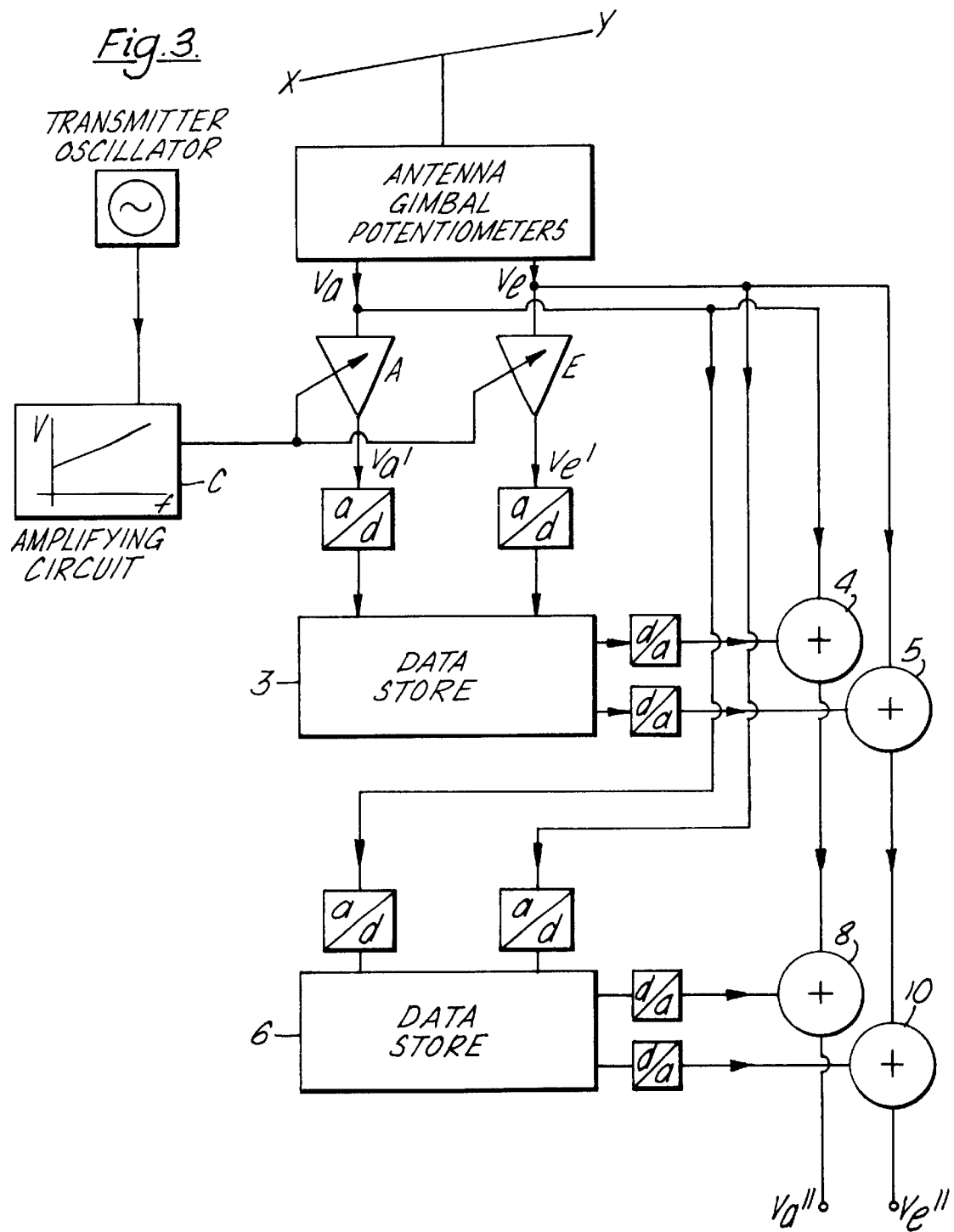
FIG. 3 is a block diagram of the basic components of the system embodiment.

Referring to the drawings, FIG. 1 shows a steerable antenna XY, which may be of slotted plate form, enclosed in the radome R. As the boresight of the antenna is steered from side to side in tracking the target there is an aberration between the true line of sight to the target and the antenna boresight.

This aberration is illustrated in FIG. 2(*a*) in which the ordinate represents the error between the true line of sight and the apparent line of sight as indicated by the boresight. The sign of the error, positive or negative, indicates the direction of the error, left or right in azimuth.

The invention arises partially as a result of the realisation that the composite error diagram of FIG. 2(*a*) can in fact be analysed into two error components, one of which is largely independent of frequency and the other of which is strongly frequency dependent. It will be appreciated that the diagrams are for a single, say azimuth, plane, and that corresponding diagrams apply for the orthogonal plane.

The basic error component of FIG. 2(*b*) arises purely from the refracting effect of the radome wall and is continuous through zero on the assumption that the radome itself is continuous through its axis. The effect of the point P (FIG. 1) of the radome, which is necessary for aerodynamic reasons, is to superimpose on the basic diagram of FIG. 2(*b*) an error component curve of the kind shown in FIG. 2(*c*), which again represents aberration against apparent target angle off boresight FIG. 2(*c*). This latter curve, it may be noted, is symmetrical about the radome axis while the basic curve of FIG. 2(*b*) is skew symmetric. More important, however, is the fact that the error characteristic of FIG. 2(c) is strongly frequency dependent and while maintaining the same oscillatory shape, very approximately, the characteristic expands and contracts along the horizontal axis as the frequency varies. This aberration is in fact dependent upon the number of wavelengths of the radar signal between the discontinuity point P and the active parts of the antenna. It may be seen that, for a particular fixed target angle off the radome axis (or 'angle-of-look') the error will oscillate as the frequency changes and the characteristic expands or contracts through the particular abscissa value.

This analysis is made use of in the arrangement of FIG. 3.

The boresight direction, i.e., the apparent line of sight to the target, is derived from potentiometers coupled to the gimbal mountings of the antenna in known manner. The azimuth and elevation planes are dealt with jointly and voltages $V_a$ and $V_e$ indicate the respective boresight angles. These signals are applied to gain-controlled amplifiers A and E to produce corresponding output signals $V_a'$ and $V_e'$. The gain of these amplifiers is controlled in unison by signals from an amplifying circuit C. The input to this circuit is a signal directly proportional to the operating frequency and may be derived directly from the oscillator frequency or from some control which determines the frequency. The characteristic of the circuit C is determined on a partly empirical basis as will be explained.

Since both variations, i.e. of $V_a$ frequency characteristic, have been incorporated in the signal $V_a'$ this signal can be used as an address signal for a relatively limited range of stored correction data, which is related by a scaling factor only, to the address signal. Thus all the complexity of frequency dependence is built into the addressing signal rather than into the stored data.

A store 3 contains the correction data, which is predetermined empirically, in digital form for both azimuth and elevation channels. The address signals $V'_a$ and $V_e'$ are converted to digital form by analogue/digital converters and the outputs from the store are converted to analogue form for application to adding circuits 4 and 5.

Figure 4:
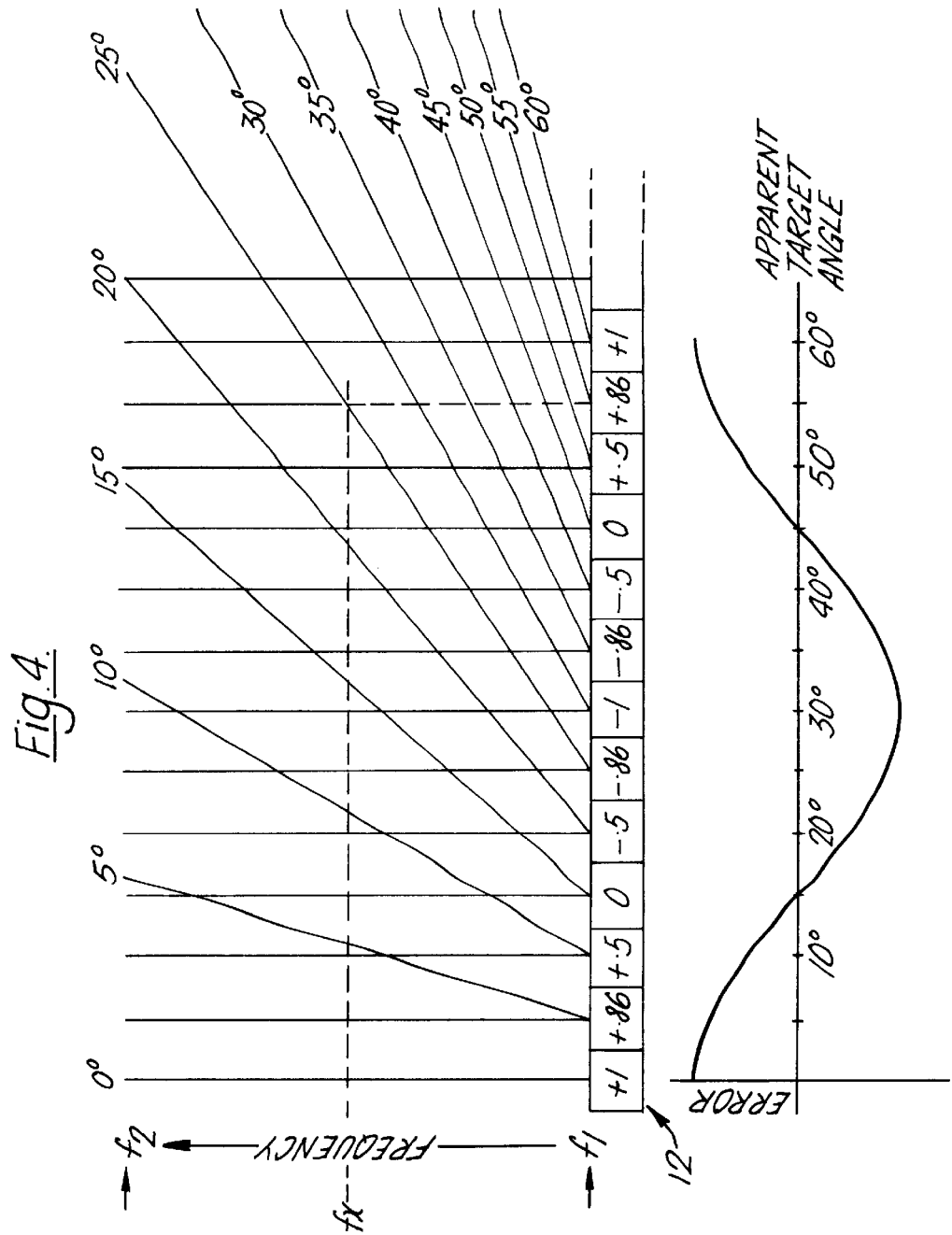
FIG. 4 is a diagram indicating a required relationship between operating frequency and angle-of-look signal magnitude.

The store 3 comprises an azimuth section, part of which is shown, referenced 12, in FIG. 4. The elements of this store section are loaded with a sequence of error values picked off the empirically determined error curve of FIG. 2(c). FIG. 4 shows the right-hand side of an idealised such error curve, taken to be a cosine curve. Clearly however, similar error values could be picked off any more practical error curve. The stored values are selected, for a particular operating condition, at intervals of apparent target angle of 5° in FIG. 4 and at a particular operating frequency ($f_1$). The frequency has of course to be specified, since the error values at the selected 'look' angles will vary cyclically with frequency as described above.

The possible range of 'look' angles, is assumed to be 0 to 60° on each side of the radome axis, this range depending upon the particular construction of antenna. The various 'look' angles are indicated, in 5° steps, by the sloping lines in FIG. 4, these lines converging upon the respective stored error values at the specified frequency $f_1$. The store section 12 is, of course, shown adjacent the frequency/look-angle characteristic merely for convenience of explanation.

The divergence of the look-angle lines may be obtained by increasing the operating frequency, say to a value $f_2$, and noting the shift of the error values. The converse of this is shown in FIG. 4, where, at the frequency $f_2$ the look-angle values have 'expanded' towards the right. It can be seen, for example, that a look-angle of 15° at frequency $f_1$ gives an error of zero, but at frequency $f_2$ gives an error of plus 0.5. At a frequency of $f_x$ say, the error at each look-angle is given by the error value vertically underneath. The error at $f_x$ for a look-angle of 25° is thus plus 0.86.

It will be appreciated that since the sloping look-angle lines diverge linearly with frequency, the error at any frequency can be derived by amplifying the look-angle indication signal $V_a$ in proportion to the frequency and using this amplified signal as an address signal to extract the corresponding error value.

Reverting now to FIG. 3, the circuit C, in its simplest form derives a signal from the transmitter oscillator indicative of the operating frequency and merely by amplification, and biasing to set the output level, produces a steady output signal also proportional to operational frequency. This output signal controls the gain of amplifiers A & E in accordance with the requirements of FIG. 4 so that at the operating frequency $f_1$ the range of azimuth signal values ($V_a$) corresponds to the range of error signal values. The gain of the amplifier A (& E) is at the same time controlled by the output of circuit C such that as the frequency increases, the range of azimuth signal values ($V_a$) covers a greater range of error values, as shown in FIG. 4. The store section 12 of FIG. 4, part of the data store 3 of FIG. 3 thus contains a series of error values of cyclic magnitude and may contain as many cycles as correspond to the maximum 'angle of look' at the highest operating frequency ($f_2$ say, in FIG. 4).

It will be appreciated that, if the horizontal expansion and compression of the error curve of FIG. 2(c) is not linear with frequency in practice, the amplifier of circuit C can be given a corresponding nonlinear gain characteristic in well known manner.

FIG. 4 has been described only in relation to look-angles on the right of the radome axis. Since the error component of FIG. 2(c) is an even function it will be appreciated that the same error value will suffice for look-angles on both sides of the radome axis.

As mentioned above, once the signal $V_a'$ has been produced it is converted to a digital signal, used to address the store 3, and thereby extract the required error value.

The original uncorrected azimuth and elevation signals $V_a$ and $V_e$ in analogue form are applied to the adding circuits 4 and 5. The outputs of these circuits are thus corrected against frequency variation.

The signals $V_a$ and $V_e$ are also applied directly (after a/d conversion) as address signals to a store 6 which contains basic correction data corresponding to the characteristic of FIG. 2(b). Store 6 is a conventional random-access memory store containing a range of error values picked off a curve such as that of FIG. 2(b). Since this error component is independent of frequency the store 6 is addressed directly by the digital version of the look-angle $V_a$ and the error values read out accordingly. The outputs of store 6 are applied to adding circuits 8 and 10 to be added to the outputs of circuits 4 and 5 respectively. The final outputs $V_a''$ and $V_e''$ are then employed as substantially fully corrected indications of the true target line of sight for the purposes of control of the missile in known manner.

It may be that digital control signals $V_s''$ and $V_e'$ are the final requirement, in which case the direct input to adding circuits 4 and 5 may be converted to digital form, these adding circuits being themselves digital. The digital correction data from the stores 3 and 6 may then be used directly.

We claim:

1. A radome aberration correcting system comprising a directional antenna system for tracking a target, a radome enclosing said antenna system, said radome having a profile discontinuity, means for deriving information from the antenna system as to the apparent line of sight of a target, said apparent line of sight having two error components, a first of said error components arising from the presence of said discontinuity and being frequency dependent, and the second of said error components arising from basic refraction and being dependent upon the angle off-boresight of the target line of sight and independent of frequency, first storage means containing data representing a range of magnitude of said first error component predetermined empirically, second storage means containing data representing a range of magnitude of said second error component predetermined empirically, means for providing a first addressing signal to said first storage means, said first addressing signal being a product function of the operating frequency and the angle off-boresight of the apparent line of sight, means for correcting the apparent line of sight in dependence upon the data in said first storage means accessed by said first addressing signal, means for applying a signal representing the apparent line of sight as a second addressing signal to said second storage means, and means for correcting the apparent line of sight in dependence upon the data in said second storage means accessed by said second addressing signal.

2. A system according to claim 1, wherein said means for providing a first addressing signal comprises a gain-controlled amplifier to the input of which is applied a signal representing apparent line of sight information, and an amplifying circuit producing a signal whose magnitude varies with operating frequency, the amplifying circuit signal being applied as a gain control signal for said amplifier, the output of which provides said first addressing signal.

3. A radome aberration correcting system comprising two parallel systems each according to claim 2, and providing separate corrections of azimuth and elevation information.

4. A radome aberration correcting system comprising two parallel systems each according to claim 1, and providing separate corrections of azimuth and elevation information.

* * * * *